United States Patent [19]
Kusmierczyk

[11] Patent Number: 5,828,992
[45] Date of Patent: Oct. 27, 1998

[54] AUTOMATED CONTROL SYSTEM WITH BILINGUAL STATUS DISPLAY

[75] Inventor: Richard Anthony Kusmierczyk, Windsor, Canada

[73] Assignee: Unova IP Corp., Beverly Hills, Calif.

[21] Appl. No.: 570,107

[22] Filed: Dec. 11, 1995

[51] Int. Cl.$^6$ ................................................. G06F 3/00
[52] U.S. Cl. ......................... 704/8; 364/188; 345/970; 345/977; 345/349
[58] Field of Search ..................... 704/8; 364/188–190; 345/326–358

[56] References Cited

U.S. PATENT DOCUMENTS

| | | | |
|---|---|---|---|
| 3,778,819 | 12/1973 | Bhagawan et al. | 340/365 |
| 4,122,533 | 10/1978 | Kubinak | 364/900 |
| 4,124,843 | 11/1978 | Bramson et al. | 340/337 |
| 4,185,282 | 1/1980 | Pick | 340/711 |
| 4,365,315 | 12/1982 | Jamnik | 364/900 |
| 4,484,305 | 11/1984 | Ho | 364/900 |
| 4,507,734 | 3/1985 | Kaldas | 364/419 |
| 4,524,414 | 6/1985 | Kiyokawa | 364/171 |
| 4,566,078 | 1/1986 | Crabtree | 364/900 |
| 4,731,735 | 3/1988 | Borgendale et al. | 704/8 |
| 4,942,514 | 7/1990 | Miyagaki et al. | 364/190 |
| 4,943,906 | 7/1990 | Tajima et al. | 364/188 |
| 5,155,806 | 10/1992 | Hoeber et al. | 395/157 |
| 5,157,603 | 10/1992 | Scheller et al. | 704/8 |
| 5,247,433 | 9/1993 | Kitaura et al. | 364/188 |
| 5,307,265 | 4/1994 | Winans | 364/419 |
| 5,387,042 | 2/1995 | Browm | 400/477 |
| 5,416,903 | 5/1995 | Malcolm | 704/8 |
| 5,432,904 | 7/1995 | Wong | 395/161 |
| 5,461,560 | 10/1995 | Uribe | 364/188 |
| 5,493,642 | 2/1996 | Dunsmuir et al. | 364/188 |
| 5,499,335 | 3/1996 | Silver et al. | 704/8 X |
| 5,513,342 | 4/1996 | Leong et al. | 704/8 X |
| 5,543,897 | 8/1996 | Altreith, III | 364/189 X |
| 5,546,521 | 8/1996 | Martinez | 395/155 |
| 5,557,549 | 9/1996 | Chang | 364/188 X |
| 5,583,761 | 12/1996 | Chou | 704/8 |
| 5,623,592 | 4/1997 | Carlson et al. | 345/348 |
| 5,640,587 | 6/1997 | Davis et al. | 704/8 |
| 5,671,378 | 9/1997 | Acker et al. | 704/8 X |
| 5,678,039 | 10/1997 | Hinks et al. | 704/8 |

FOREIGN PATENT DOCUMENTS

| | | | |
|---|---|---|---|
| 0272877 | 6/1988 | European Pat. Off. | G06F 15/50 |
| 0376741 | 7/1990 | European Pat. Off. | G05B 19/04 |
| 0499211 | 8/1992 | European Pat. Off. | G05B 19/04 |
| 0563390 | 10/1993 | European Pat. Off. | G05B 19/05 |

*Primary Examiner*—John E. Breene
*Attorney, Agent, or Firm*—Barnes, Kiselle, Raisch, Choate, Whittemore & Hulbert, P.C.

[57] ABSTRACT

Automated control system status information is displayed to a system operator by storing in electronic memory first fields of graphic indicia for generating at an operator display graphic representations of system conditions to be monitored and second fields of text indicia associated with the graphic indicia. The second fields of text indicia are stored in sets of separate sub-fields in each of two text languages, with each set in each sub-field being associated with a specific first field of graphic indicia. The system operator may alternately select between the sets of sub-fields of text indicia in such a way that the text fields displayed simultaneously with the graphic fields at the operator status display are all in one or the other of the two text languages.

8 Claims, 7 Drawing Sheets

AUTOMATED CONTROL SYSTEM WITH BILINGUAL STATUS DISPLAY

The present invention is directed to automated control systems, and more particularly to a method and apparatus for displaying system status information graphically and textually in either of two selectable text languages.

BACKGROUND AND SUMMARY OF THE INVENTION

It is currently a common occurrence for an automated control system to be designed and constructed in one geographic area or country, and to be installed and operated in another geographic area or country in which a different language is employed. Even when the system control programming is written in a single language, or separate interchangeable programs are written in the two languages in question, difficulties are encountered in displaying status information to system operators for set-up and maintenance purposes, and during normal operation. For example, where an automated transfer system is designed and built in the U.S., and then shipped to Russia for installation and use, the actual control programming can be written in either English or Russian DOS. However, it is desirable to have the ability to display system status information in either English or Cyrillic text, as well as in graphic indicia associated with the text and understandable by persons speaking either language. The system display may be switched to English display text during set-up or maintenance operations by representatives of the American manufacturer, for example, and to Russian display text during normal operation.

It is a general object of the present invention to provide a system and method for displaying status information associated with an automated control system in which the status information is displayed both graphically and texturally simultaneously, and in which the textural information is selectively displayed in either of two (or more) text languages. Another object of the present invention is to provide a system and method for status display of the described character that can be readily implemented, and that are structured such that the display text languages can be readily altered without substantial redesign or reconfiguration of the display system.

Automated control system status information is displayed to a system operator in accordance with the present invention by storing in electronic memory first fields of graphic indicia for generating at an operator display graphic representations of system conditions to be monitored and second fields of text indicia associated with the graphic indicia. The second fields of text indicia are stored in sets of separate sub-fields in each of two text languages, with each set in each sub-field being associated with a specific first field of graphic indicia. The system operator may alternately select between the sets of sub-fields of text indicia in such a way that the text fields displayed simultaneously with the graphic fields at the operator status display are all in one or the other of the two text languages.

BRIEF DESCRIPTION OF THE DRAWINGS

The invention, together with additional objects, features and advantages thereof, will be best understood from the following description, the appended claims and the accompanying drawings, in which:

DETAILED DESCRIPTION OF PREFERRED EMBODIMENT

The system and method of the present invention are disclosed in connection with a transfer system in an automotive manufacturing environment. However, it will be appreciated that the principles of the present invention in their broadest aspects would apply equally as well to other automated control environments.

Figure 1:
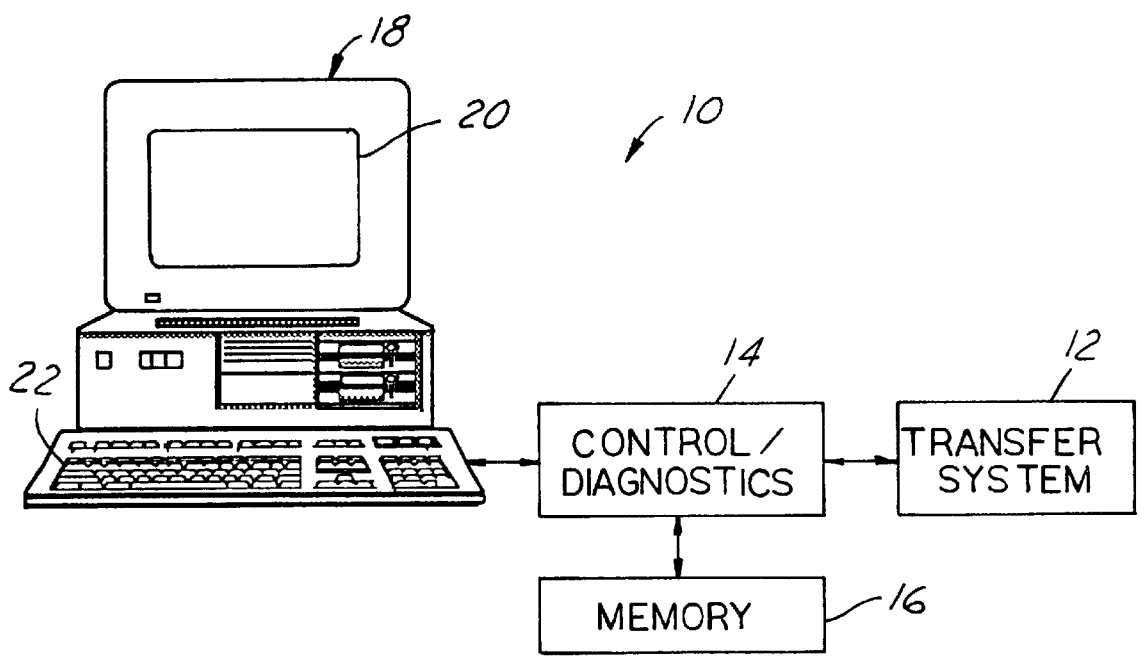
FIG. 1 is a functional block diagram of an operator status display system in accordance with the present invention associated with an automated transfer system.

FIG. 1 illustrates a control and status display system 10 associated with an automated transfer system 12 as including control/diagnostic electronics 14 coupled to transfer system 12 both for controlling operation thereof, and for receiving feedback information indicative of transfer system operating status. Control/diagnostic electronics 14 is coupled to an electronic memory 16 for obtaining control programming and information as is conventional in the art, and for obtaining display indicia from memory 16 in accordance with the present invention. Control/diagnostic electronics 14 is also connected to an operator display 18 that includes a display screen 20 and an operator keyboard 22. Keyboard 22 includes function keys for selectively controlling the operator display, as will be described. Alternatively, display 20 may comprise a touch-panel display in which the display language is selectively controlled by the operator through touch panel sections displayed on the screen, or a voice analyzer executing voice commands.

Figure 2A:
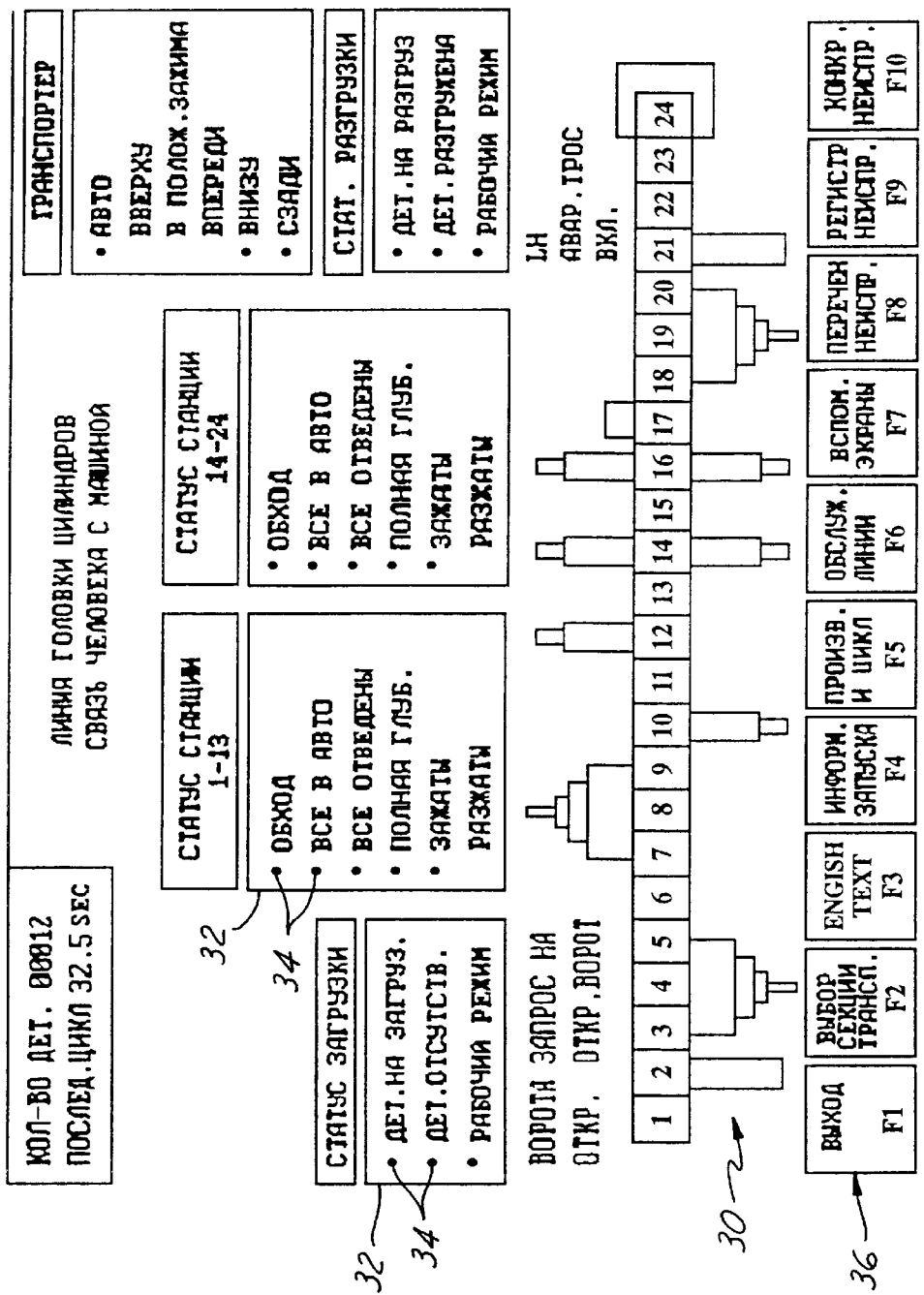
FIGS. 2A and 2B, 3A and 3B, and 4A and 4B illustrate pairs of status display screens containing common graphic indicia, and text indicia in accordance with the present invention in either Cyrillic or English.
Figure 2B:
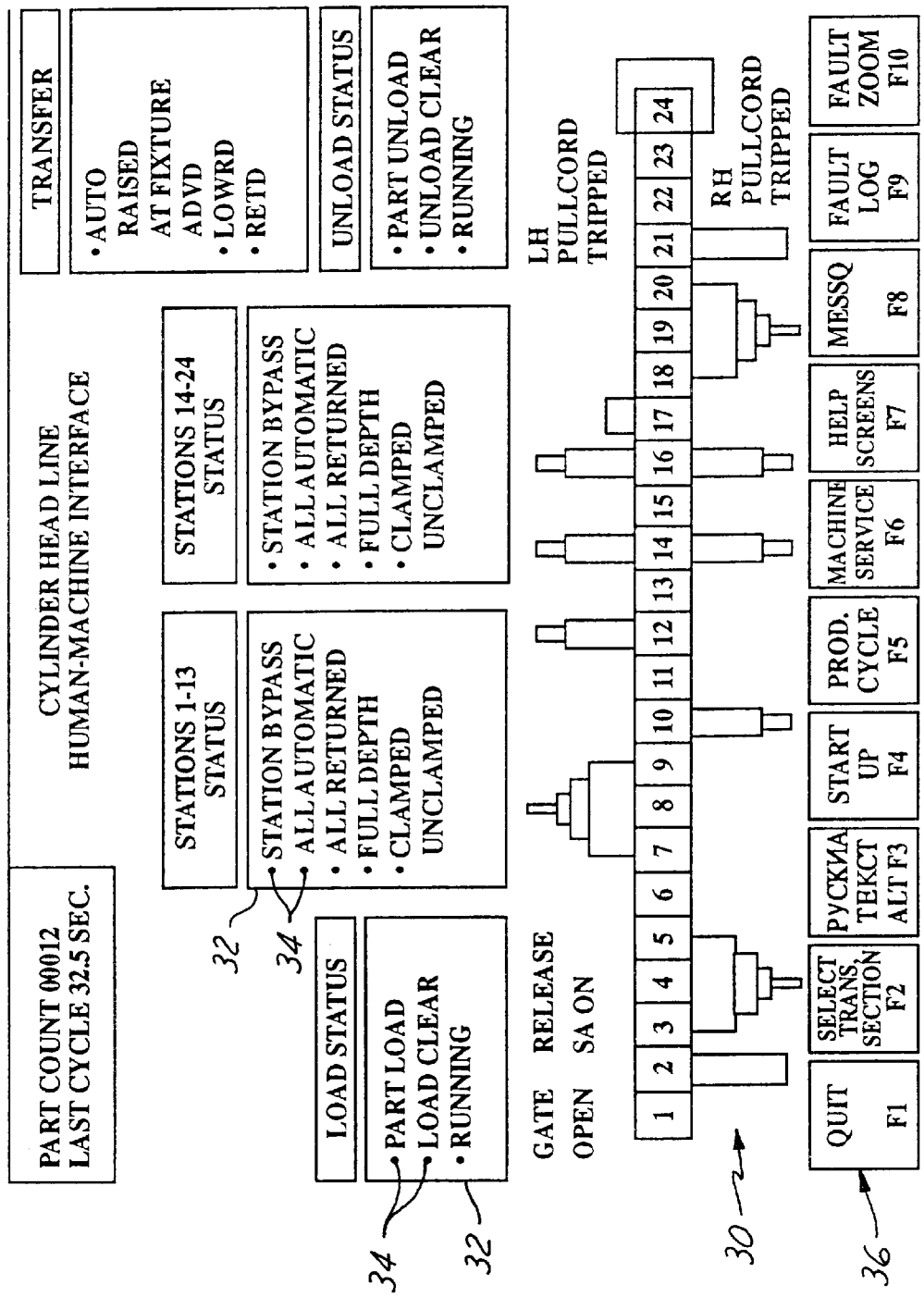

FIGS. 2A and 2B illustrate displays of overall transfer system status in Russian (FIG. 2A) and English (FIG. 2B). In each display, there is graphic display information such as the graphic illustration 30 of the transfer system and the various stations 1–25 thereof, and boxes and status indicators 32, 34 surrounding and adjacent to status information in the form of alphanumeric text indicia. Associated with the graphic indicia in both FIGS. 2A and 2B—i.e., boxes 32 and status indicator indicia 34—is a field of alphanumeric text indicia displayed simultaneously with the graphic indicia. This alphanumeric text indicia is stored in sub-fields for display either in Russian (FIG. 2A) or in English (FIG. 2B). These text sub-fields may be stored either as text files generated using an appropriate keyboard—i.e., an English keyboard in the case of FIG . 2B or a Russian keyboard in the case of FIG. 2A—or may be stored as a graphic sub-field. The graphic file may be generated employing any suitable conventional means, and is particularly advantageous for languages with non-Latin alphabets such as Russian and Chinese.

The lower portions 36 of each display in FIGS. 2A and 2B illustrate function keys F1 through F10 for selecting various status and control features. For example, function key F1 in each display selects the option to "quit" the associated display, and function keys F2 and F4–F10 in each display select other status display options. Function key F3 in each display allows the operator to switch back and forth between the English and Russian text displays, the graphic portion of each display being the same. Thus, with information displayed in English as illustrated in FIG. 2B, depression of function key F3 with Russian description on keyboard 22 (FIG. 1), or touching the F3 section of a touch-panel display (or giving a voice command), automatically switches the textual portion of the display from English (FIG. 2B) to Russian (FIG. 2A). Once Russian is selected for the display text indicia, all further status displays will include Russian text until English text is reselected.

Figure 3A:
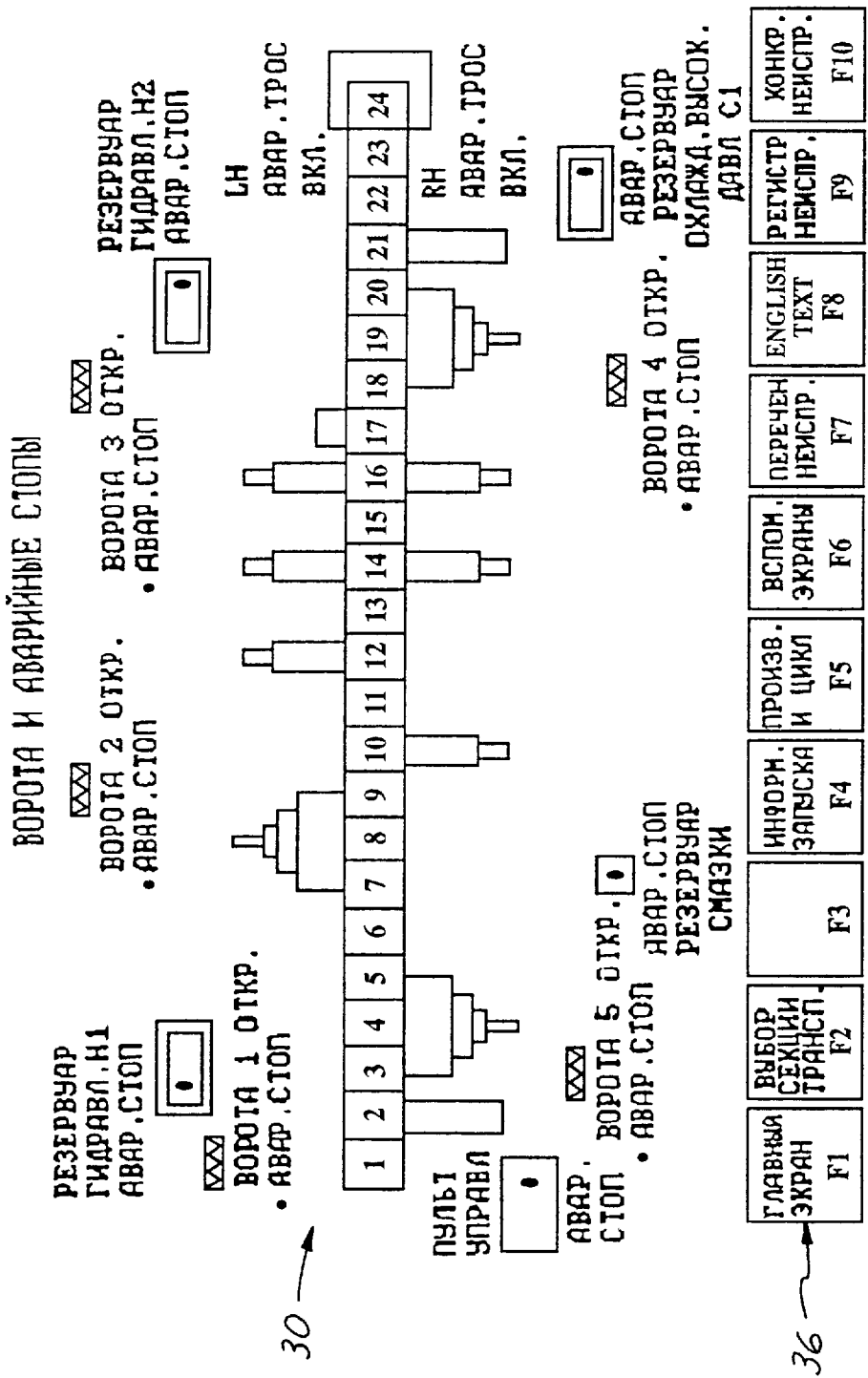
Figure 3B:
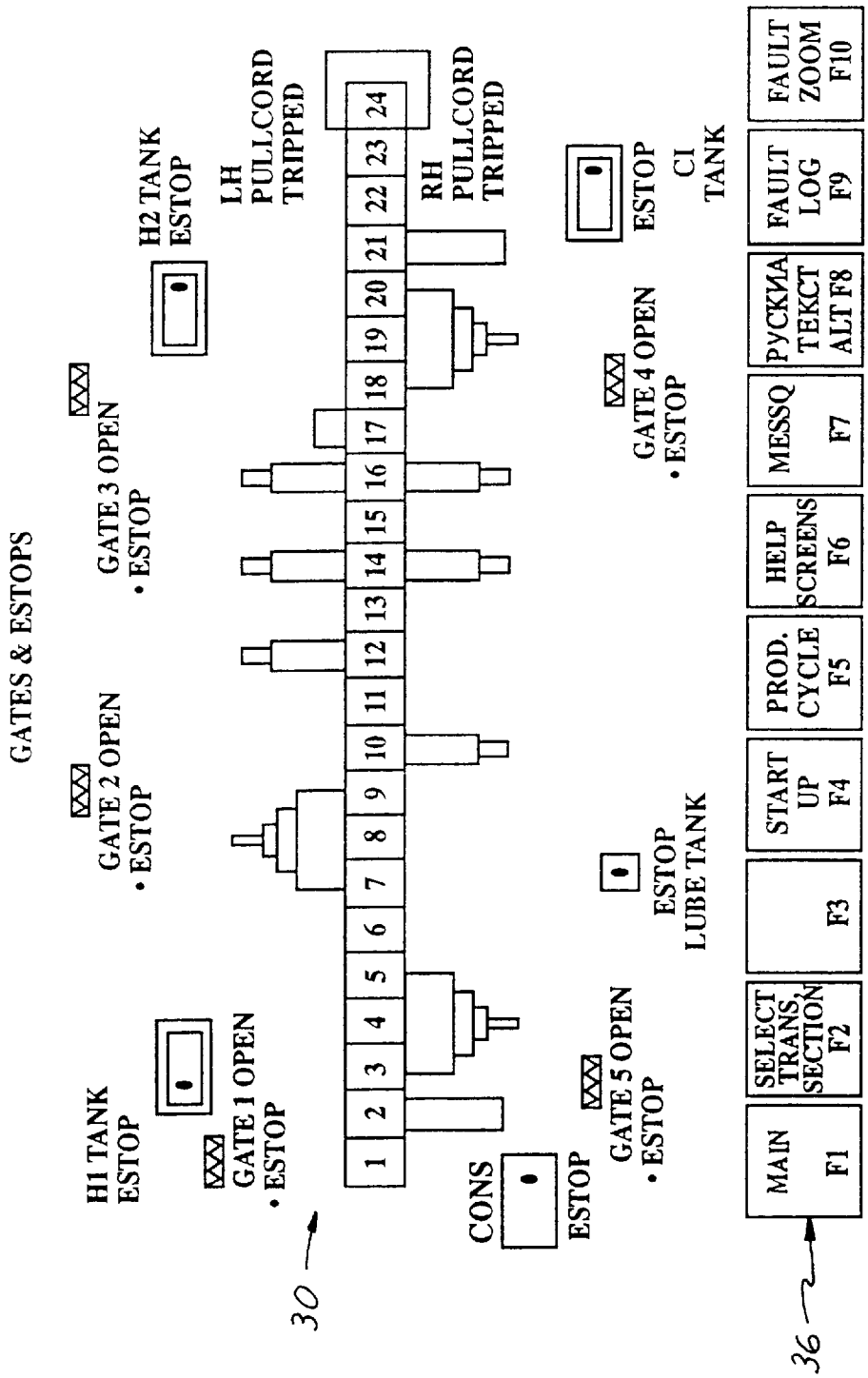
Figure 4A:
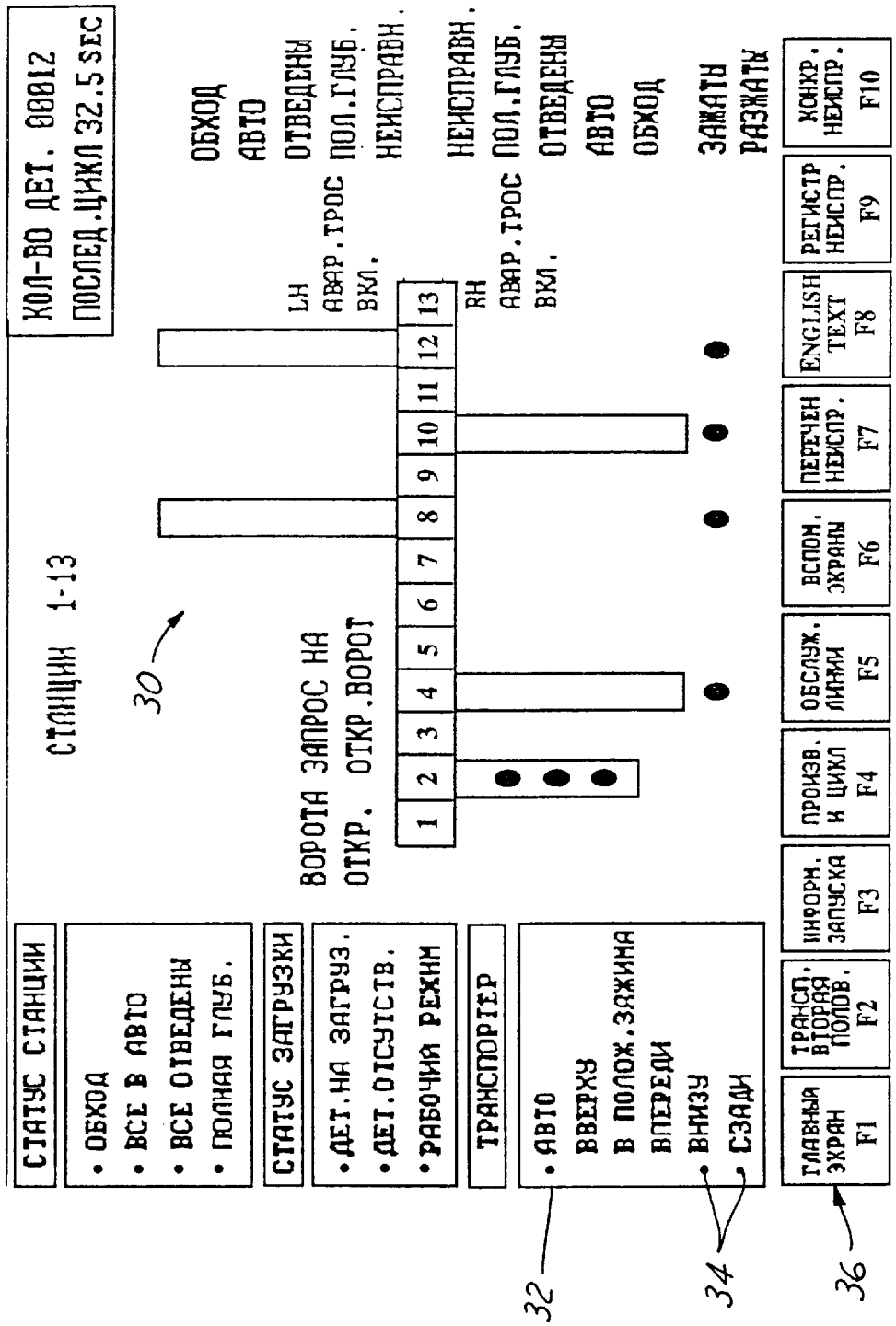
Figure 4B:
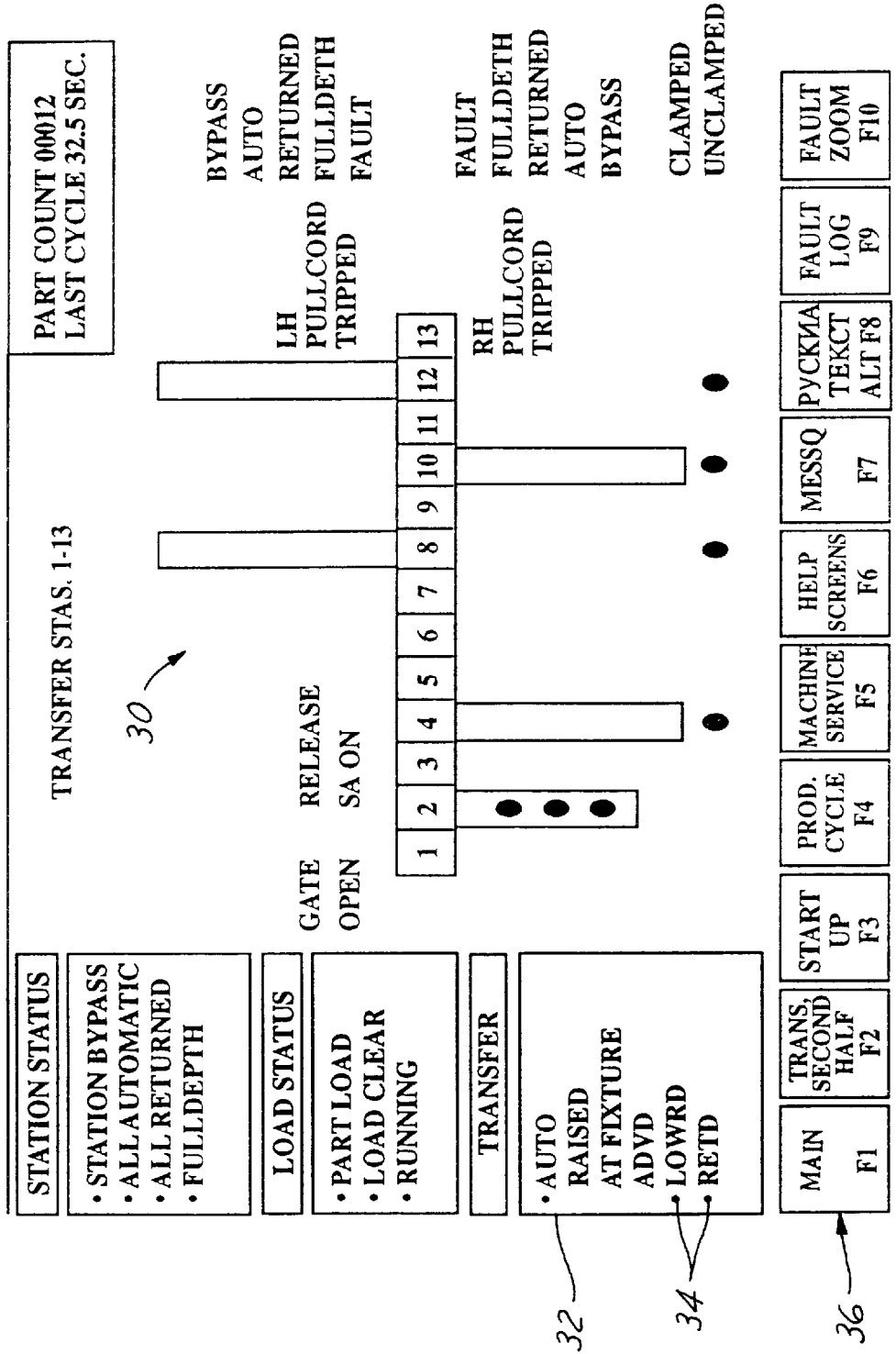

FIGS. 3A and 3B illustrate a different status display showing the status of the gates and emergency stop elements at each of the transfer line stations 1–25, either in Russian (FIG. 3A) or English (FIG. 3B). In these displays, function key F8 is employed for selecting either Russian or English as the display language. Once again, the graphic portions of the displays are identical, while the adjacent text portions of the displays are selectively switchable between Russian and English. FIGS. 4A and 4B illustrate another screen display, this time showing the status of the gates at transfer stations 1–13. Again, the graphic portions are identical, while the adjacent text portions are selectively switchable between Russian and English by means of function key F8.

There have thus been disclosed a method and apparatus for automated control system status display in which graphic indicia for each screen and text indicia for each screen are stored in memory as separate display fields. The text indicia is stored as separate sub-fields in each of two text languages, with the sub-fields being selectable by the operator. When the status display is generated, the graphic field and the selected text sub-field are displayed simultaneously so that the text in the selected language is associated with the appropriate portions of the graphic display. The text sub-fields are stored in separate portions of memory respectively associated with the two text languages, and are selectively accessed under control of the operator. The sub-fields of text indicia may be stored as either text or graphic files as may be appropriate for the language in question. The principles of the invention may be employed equally as well for selectively displaying status text information in more than two languages, if desired.

I claim:

1. In a method of displaying control information to an operator in an automated control system that comprises the steps of:

(a) storing in electronic memory first fields of graphic indicia for generating at an operator display graphic representations of conditions to be monitored and second fields of text indicia associated with the graphic indicia, and (b) selectively displaying at an operator display one of first fields of graphic indicia and an associated field of text indicia so that both graphic and text indicia are simultaneously displayed to an operator, the improvement for selective bilingual display of said text indicia with said graphic indicia wherein: said step (a) includes the step of: storing said second fields of text indicia in sets of separate sub-fields in each of two text languages, with each said set being associated with a specific first field of graphic indicia, and said step (b) includes the step of: alternately selecting between said sets of sub-fields of text indicia in such a way that the text fields displayed with said graphic fields are all in one or the other of said two text languages.

2. The method set forth in claim 1 wherein said step (a) is accomplished by storing said sets of sub-fields as either text or graphic files.

3. The method set forth in claim 1 wherein said step (a) is accomplished by storing said sub-fields in separate portions of said electronic memory respectively associated with said two text languages, and wherein said step (b) is accomplished by selectively accessing said separate portions of memory under control of an operator.

4. An automated control system status display that comprises:

control means for connection to a control system for controlling and monitoring status thereof, display means including a screen for displaying system status information to an operator, electronic memory coupled to said control means and said display means, and having prestored therein first fields of graphic indicia representative of conditions monitored at said system, and second fields of text indicia associated with said graphic indicia, said second fields of text indicia being stored in sets of separate sub-fields in each of two text languages, with each said set being associated with a specific first field of graphic indicia, means for operator selection between said sets of sub-fields, and means coupled to said control means, said display means, said memory and said selection means for selectively displaying on said screen one of fields of graphic indicia and an associated sub-field of text indicia, in a text language selected by the operator, to indicate both graphically and textually information related to status of the system.

5. The method set forth in claim 1 wherein said step (b) is accomplished by alternately selecting between said sets of sub-fields of text indicia on the basis of text language while said graphic fields remain fixed on said operator display.

6. The method set forth in claim 5 wherein in said step (b), the selection of a set of sub-fields of text indicia on the basis of text language remains selected for display on said operator display until another set is selected.

7. The display of claim 4 wherein said selection means comprise means for selecting, on the basis of text language, the set of sub-fields of text indicia displayed with a field of graphic indicia while the field of graphic indicia remains fixed on said display means.

8. The display of claim 4 wherein said selection means comprise means for selecting, on the basis of text language, the set of sub-fields of text indicia displayed with a field of graphic indicia while the field of graphic indicia remains fixed on said display means, wherein said selected set of sub-fields of text indicia remains selected until another set is selected.

\* \* \* \* \*